United States Patent [19]

Humphries et al.

[11] Patent Number: 4,866,316

[45] Date of Patent: Sep. 12, 1989

[54] METHOD AND APPARATUS FOR CHANGING THE PHASE SEQUENCE OF A COMPLETED GENERATOR

[75] Inventors: Benjamin T. Humphries, Orlando; Aleksandar Prole, Winter Springs, both of Fla.

[73] Assignee: Westinghouse Electric Corp., Pittsburgh, Pa.

[21] Appl. No.: 240,766

[22] Filed: Sep. 2, 1988

[51] Int. Cl.[4] ............................................. H02K 11/00
[52] U.S. Cl. ........................................ 310/71; 310/52; 310/59; 310/89
[58] Field of Search .................. 310/52, 53, 58, 59, 310/71, 89; 361/341, 426, 428

[56] References Cited

U.S. PATENT DOCUMENTS

| | | | |
|---|---|---|---|
| 3,808,489 | 4/1974 | Albright et al. | 310/52 |
| 3,903,441 | 9/1975 | Towne | 310/71 |
| 4,172,984 | 10/1979 | Daugherty et al. | 310/71 |
| 4,199,700 | 4/1980 | Daugherty et al. | 310/59 |
| 4,488,072 | 12/1984 | Archibald et al. | 310/89 |

Primary Examiner—Patrick R. Salce
Assistant Examiner—Anita M. Ault
Attorney, Agent, or Firm—M. G. Panian

[57] ABSTRACT

A standard, predetermined phase sequence of the three-phase voltage output of an electrical power generator, as produced through conventional main leads in the generator lead box which interconnect three (3) generally, axially aligned pairs of connectors of first and second sets, is selectively reversible by the utilization of crossed main leads between two adjacent pairs of the connectors of the first and second sets. Each of the crossed main leads includes opposite end portions aligned with the diagonally-related and interconnected pair of connectors of the first and second sets, the end portions having corresponding bends therein for smoothly contouring and integrally joining the central portions thereof, and the central portions have complementary outward bends in at least the mutual crossing portions thereof to maintain a predetermined, minimum distance therebetween so as to satisfy voltage strike requirements. Insulating support plates maintain the required minimum distance between the mutual crossing portions and special, directional ventilating ducts compensate for increased eddy current heating of localized areas of the lead box.

12 Claims, 7 Drawing Sheets

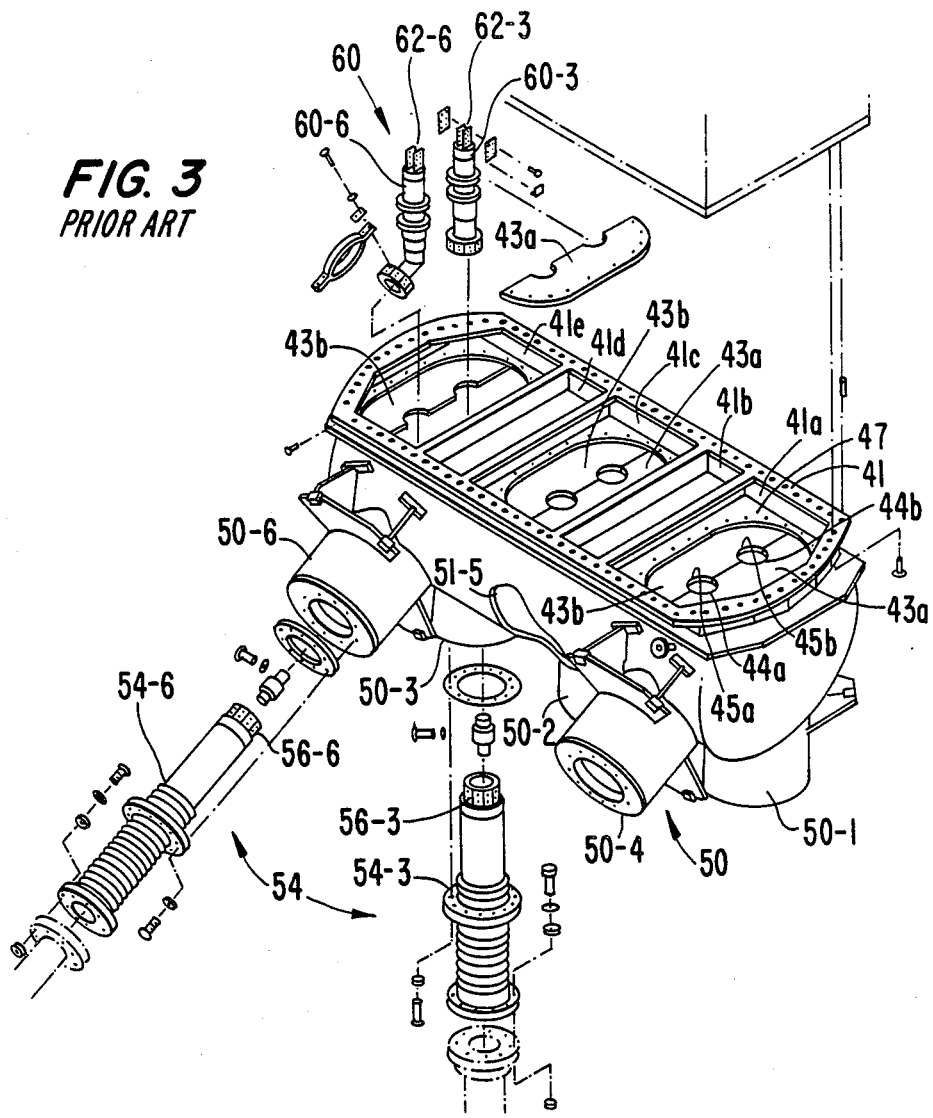

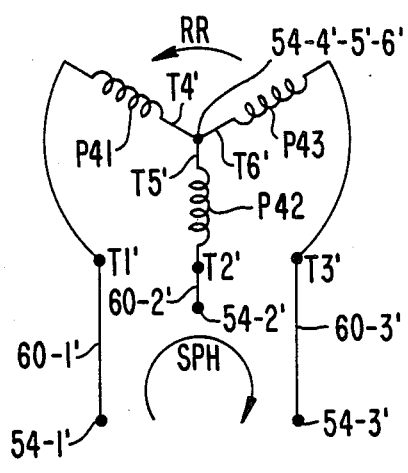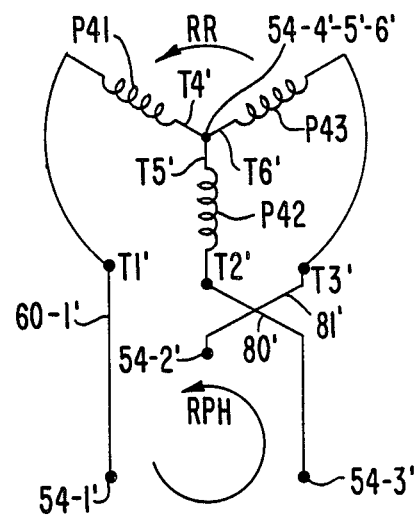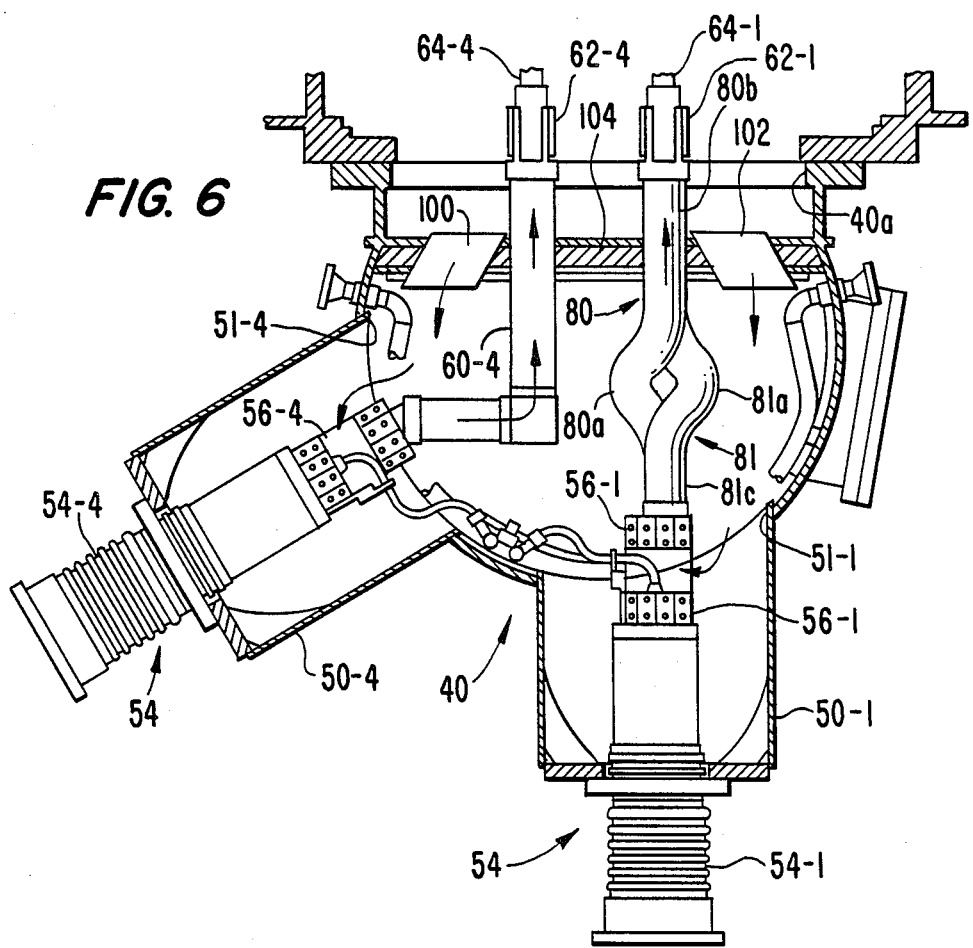

METHOD AND APPARATUS FOR CHANGING THE PHASE SEQUENCE OF A COMPLETED GENERATOR

BACKGROUND OF THE INVENTION

Field of the Invention

This invention relates to dynamoelectric machines such as large turbine-driven electrical power generators and, more particularly, to a method and apparatus for changing the phase sequence, or direction of phase rotation, of a completed such generator.

CROSS-REFERENCE TO RELATED U.S. APPLICATION

The invention herein is related to that disclosed in the co-pending application entitled "METHOD AND APPARATUS FOR CONDUCTING CURRENT FROM A DYNAMOELECTRIC MACHINE," Ser. No. 288,369, filed Dec. 22, 1988, and assigned to the common assignee herein.

State of the Relevant Art

Large dynamoelectric machines, such as turbine-driven electrical power generators, are massive structures, both mechanically and electrically complex and expensive, with typical power ratings ranging up to 1,500 MVA at voltages up to 26 kV. Traditionally, they are individually, custom designed for compliance with the requirements and specifications of a given customer, e.g., a utility company. The principal customer specification to which the present invention relates involves the phase sequence of the generator output voltages, namely, the relationship of the time sequence of the peak emf values of the three voltage phases of the stator winding output to the direction of rotation of the rotor.

In general, the phase sequence of a generator is determined by the direction of rotor rotation and the design of the so-called parallel rings, comprising copper conductors that connect the stator phase coils to the main power output leads of the generator. The parallel rings extend coaxially about the outside circumference of the so-called coil basket formed by the ends of the coil sides which protrude in an annular array from the end of the stator core toward the exciter end of the generator. The parallel rings are arranged in plural, e.g., four to seven, banks of axially-spaced circular paths of common radius, from whence derives the "parallel ring" nomenclature. Each parallel ring conductor extends through only a segment of the circular path of a given bank and each bank has two or more ring conductors disposed in corresponding path segments. In one specific such turbine generator of three phases and four poles, twenty-four different such conductor rings are disposed in predetermined, respective circular segments of six banks for, variously, electrically connecting certain of the coil sides in series and/or connecting the phase coil terminating ends to the main leads of the generator. The number and the locations of the parallel conducting rings in each of the plural banks varies in the circumferential direction according to the number of poles, the series or parallel character of the stator winding, and the split or full character of the phase zones of the stator windings. While, in general, the number and locations of the parallel conducting rings is also a function of the number of phases, it can be assumed that in generators of the type herein contemplated, the number of phases is always three (3).

In generators of the type here considered, a given such parallel ring conductor must accommodate an amperage rating of several thousand amperes, e.g., in excess of 30,000 amperes. For the specific generator herein demonstrated, the parallel rings are made of square copper tubes having outside dimensions of 2.0 inches by 2.0 inches or 2.5 inches by 2.5 inches depending on the machine rating. In either instance, the wall thickness of the tubes is ⅜ths of an inch. Each ring is electrically insulated, e.g., to a rating of approximately 26 kV, such as by glass-backed mica paper of approximately 0.38 inches thickness; further, because of the high voltage and current levels in the rings, substantial structural supports of insulating material are provided for maintaining the axial spacing and radial positions of the rings, all of which must be designed so as to avoid voltage creep and strike. Moreover, cooling of the parallel ring conductors is required, in this case by a forced flow of gas therethrough, e.g., $H_2$. The precise structure and method of cooling of the rings is not limiting, and the foregoing is set forth merely as illustrative of a specific generator to which the present invention, hereinafter described, may be and has been applied. Thus, there are alternative such ring structures, for example, employing water cooling rather than gas and having somewhat differing dimensions of the rings but generally conforming to the foregoing description.

As before-noted, the parallel rings must be configured so as to produce a specified phase sequence, for a given direction of rotor rotation. This has reference to the time sequence of the peak emf values of the three output voltage phases of the generator, as produced at three corresponding output terminal connectors, which typically are mounted on and extend externally of a generator lead box, and to which the utility customer connects its further equipment, such as a step-up transformer. (Typically, six such connectors, surrounded by corresponding bushings, exit from the lead box and respectively correspond to the six phase coil terminating ends, i.e., two such ends for each of the three stator winding phases. The remaining three connectors are electrically interconnected by a shorting bus bar to complete a "Y-connection" of the three stator winding phases.) So-called "main leads" extend through the lead box in generally parallel axial and spaced relationship, between respective connectors of a first set which are connected to respective parallel conductor rings associated with the phase coil terminating ends, and respective connectors of a second set which are associated with respective terminal connectors. These "main leads" are typically copper pipe conductors of an outside diameter of approximately 5 inches and an inside diameter of 4.5 inches and are carefully designed as to spacing and insulation thereon to satisfy voltage strike and creep limitations.

Referencing the three generator output terminal connectors to which the customer connections are made as T1, T2, and T3, some utility customers require that the generated electromotive forces peak from left to right (i.e., T1-T2-T3) while others require peaking from right to left (i.e., T3-T2-T1). Accordingly, depending upon the customer's specification of "left to right" or "right to left" directions of phase sequence, the manufacturer will design and install the appropriate and required parallel conducting ring structure, taking into account the direction of rotor rotation.

Manufacturers of large dynamoelectric machines of the type here considered typically standardize the direction of rotor rotation. For example, the assignee herein has adopted the standard of counter-clockwise rotation of the rotor as viewed from the exciter end of the generator, and correspondingly designates the direction of phase sequence from "left to right" as the "standard" phase sequence—and that from "right to left" as "opposite" or "reverse" phase sequence. (Some manufacturers, on the other hand, have adopted the opposite standard of a clockwise direction of rotor rotation and accordingly designate "left to right" as the "reverse" (or "opposite"), and "right to left" as the "standard," directions of phase sequence.) Accordingly, based on the customer specifications and consistent with traditional production practices, either a "standard" or a "reverse" (or "opposite") parallel ring connection would be installed in a given generator—thus, predetermining the direction of phase sequence of the completed generator.

Circumstances have developed in the recent past which have frustrated this traditional practice of custom design of large generators, each with a single and predetermined direction of phase sequence. In some instances, reduced power consumption, poor planning and/or economic factors have resulted in a utility customer not accepting a previously-ordered and completely constructed generator. The generator thus held in inventory by the manufacturer may have the wrong direction of phase sequence and thus be inappropriate for another prospective customer for that generator. An analogous circumstance faces a utility customer which has several power plants, some with the opposite phase sequence direction requirement than others, and which desires to purchase a turbine generator to be held as a spare to replace a failed generator at any one of the several power plants. In any of these or similar such circumstances, serious obstacles are presented when a completely constructed generator, which otherwise satisfies the requirements of a given utility customer, nevertheless has the opposite phase sequence to that which the customer specifies and requires. While the invention of the above, cross-referenced application addresses that circumstance by special steps taken in the construction of a generator so as to permit a simplified selection of one or the other directions of phase sequence at the time of placing the generator into use, heretofore there has been no known technique for changing the predetermined direction of phase sequence of an already, completely constructed generator.

More particularly, the available alternatives for adapting a generator having the wrong direction of phase sequence relative to a given, prospective customer's requirements, are unacceptable. One alternative is to design and install a completely new set of parallel rings. This procedure is both very expensive and time consuming. While the expense factor itself creates a competitive disadvantage, the associated delays in delivery time and installation of the replacement generator, in the case of a failed generator at a given power station, may be altogether unacceptable. For example, the resultant down-time of that power station may create an emergency power situation for the service area and/or pose the economically unacceptable alternative of the utility's purchasing power from other suppliers for the service area. The alternative of requiring the customer to interchange, or "swap," the appropriate leads from the generator to the utility customer's step-up transformer, on the other hand, introduces factors of customer unacceptability of the interfacing requirement and of additional technological complications and critical down-time to effect the changeover.

Thus, there exists a serious need in the industry for a simplified manner of changing the direction of phase sequence of a completed electrical power generator which avoids the unacceptable time and expense factors, above-noted, and which satisfies the critical mechanical and electrical design standards and safety factors attendant such high power, massive and expensive equipment.

SUMMARY OF THE INVENTION

In accordance with the present invention, means and apparatus are provided for changing the direction of phase sequence of a dynamoelectric machine, such as a turbine generator, in a manner which does not alter the external configuration of the generator and which does not require redesign and restructuring of major internal components, such as parallel rings and/or the interconnections between such parallel rings and the coil ends. The change of phase sequence is accomplished by replacing two adjacent, conventional main leads within the lead box with a pair of crossed main leads, specially configured and supported within the lead box so as to satisfy electrical strike and creep factors, force factors produced by current effects, and by the provision of directional ventilating ducts for directing a coolant gas flow against localized portions of the lead box walls which are subjected to increased heating produced by increased levels of eddy currents caused by the crossed main leads. More particularly, any two adjacent conventional main leads connected to respective power output terminals of the generator to which the customer connections are made, as before defined, are replaced by a pair of crossed main leads which effect the opposite interconnections of the corresponding connectors of the first and second sets, also as before defined. By providing one set of standard (i.e., generally parallel and spaced) main leads and a second set of crossed main leads for each generator, the generator may be adapted for either specified direction of phase sequence at minimum time and expense.

While simplistic in concept and consistent electrically with the conventional practice of switching leads for changing the direction of rotation of a three-phase motor, substituting crossed main leads for an electrical power generator has not previously been done, to the knowledge of the inventors. Moreover, crossing the main leads of a large generator is contrary to conventional design standards and introduces numerous problems and uncertainties not heretofore addressed in the relevant art and technology and, accordingly, for which no known solution exits—but which problems have been defined, and the solutions therefore have been defined, in accordance with the present invention.

For example, conventional design considerations dictate the use of main leads of minimum length and having substantially straight, parallel and uniformly spaced axes, for interconnecting respective, generally aligned connectors of the first and second sets as before described. Substituting a pair of crossed main leads, however and by definition, requires that the leads cross one another throughout at least some intermediate portion of the lengths thereof and in relatively closely spaced relationship. Based simply on geometric considerations, the main leads may "cross" throughout a range of angular relationships, extending from crossing in a mutually perpendicular axial relationship to a mutually parallel axial relationship, the former minimizing the extent of the respective intermediate lead portions which are in proximate relationship with each other and the latter maximizing same. The proximity, however much the extent, produces increased short circuit current forces and eddy current effects, both between the crossed main leads and with respect to the lead box. Particularly, the changed eddy current flow pattern through the lead box (e.g., the horizontal current component, the phases, and the fact that the returns are no longer in line) produces increases in the eddy current flow in localized regions of the lead box walls with attendant, increased localized heating. Moreover, whereas a mutually perpendicular axial crossing of the main leads minimizes the extent of the increases in the eddy current flow in and short circuit current forces acting between the crossed main leads and resultant heating thereof, it maximizes the adverse effects in the lead box; conversely, whereas a parallel axial relationship of the crossing portions of the main leads tends somewhat to cancel the respective fields produced by the current flows therethrough and thus minimize the extent of increase in the forces acting between the main leads and the lead box and eddy current heating of the lead box, this relationship maximizes the forces acting between and the heating of the crossed main leads. Crossing of the main leads moreover results necessarily in not only extending the respective lengths of each but also configuring same such that the opposite ends of each of the crossed main leads are aligned with the respective, alternate, and nonaligned (i.e., diagonally related) pairs of connectors of the first and second sets. Moreover, adequate spacing between the crossed main leads, throughout the intermediate, mutual crossing portions thereof is necessary to maintain adequate strike distances, in accordance with the test voltages and subsequent actual operating voltages which must be withstood. The space available within the lead box of course is a limiting factor as to the configuration of the crossed main leads, since in the usual application of the present invention, a standard lead box for housing the main leads is to be employed, to maintain physical compatibility with the contemplated customer installation of the generator.

In accordance with the invention, these and other problems which, under standard design considerations, would dictate against the use of crossed main leads, have been overcome, variously, by special design provisions and surprising discoveries attendant the actual construction and operation of a commercial turbine generator employing a pair of crossed main leads for achieving reversal of the phase sequence. In accordance with the invention, it was determined that the central portions of the pair of crossed main leads, intermediate the respective, end portions thereof aligned with the diagonally-related connectors of the first and second sets, should not extend in parallel (and thus horizontal) relationship, but rather should extend generally diagonally so as to define acute included crossing angles and further that the central portions should be displaced from one another at least in the intermediate, mutual crossing portions thereof, so as to satisfy strike distance requirements. While the configuration as thus defined could be achieved by elbows or offsets, the need for special castings of such offset or elbow elements, while offering a technically feasible solution, presents undesirable expense. However, in accordance with a preferred embodiment of the invention, it was surprisingly discovered that the required configuration of the crossed main leads could be achieved by suitable bending of copper pipe of the type used for conventional main leads and thus of approximately 5 inches outside diameter and 4.5 inches inside diameter but of greater axial length than the conventional main leads which the crossed main leads are to replace, so as to span the greater, diagonal distance between the respective upper and lower sets of connectors. In performing such bends, it is critical to assure that the interior diameter and circular cross-section of the pipe are maintained uniform, and that metal fatigue or cracking and other possible defects are not introduced by the bends, which would adversely affect the capability of the crossed leads to conduct the required, extremely high current levels.

More particularly, in accordance with the invention and as actually practiced, due to different spacings between the two connectors of the first set and the two connectors of the second set to be diagonally interconnected by the crossed main leads, copper pipes of approximately 70 inches and 80 inches, respectively, were employed. Each was bent adjacent its respective opposite ends through a bend radius of approximately 8 inches to align the opposite ends with the respective, diagonally related and non-aligned connectors of the first and second sets. Further, central portions, each of approximately 25 inches, of the respective pipes encompassing the mutual crossing portions thereof were bent through a bend radius of curvature of approximately 36 inches. The crossed main leads, as thus bent, had effectively complementary, oppositely contoured mutual crossing portions affording thereby the requisite physical separation, in conjunction with electrical insulation provided thereon, for withstanding test and operating voltages. More specifically, the provision of electrical insulation on the crossed main leads, consistent with the insulating standards for the strike and creep distances established for the parallel rings, in combination with the physical displacement of the crossed main leads by the afore-recited complementary bends in the central portions spanning the intermediate, mutual crossing portions, was determined to satisfy the requisite voltage strike and creep standards.

Eddy current induced force effects between the crossed main leads, and between the crossed main leads and the lead box, moreover are overcome by the provision of special insulating support plates symmetrically disposed relatively to and adjacent the extremes of the intermediate, mutual crossing portions of the pair of crossed main leads. It was surprisingly discovered that, despite the increased length of the crossed main leads and the proximity thereof in their intermediate, mutual crossing portions, that the expected increased heating due to increased eddy current effects was sufficiently limited such that the conventional coolant flow through the interior of the crossed main leads and within the lead box sufficed to maintain adequate temperature levels of the crossed leads, in operation.

Further, in accordance with the invention, the unusual eddy current effects and resultant increased heating in the sidewalls of the lead box were determined to produce increased eddy currents and resultant increased heating only in limited, localized areas of the lead box walls. In that context, the induced eddy currents in the lead box walls tend to reflect their sources, i.e., the currents in the crossed main leads, both in flow pattern and intensity. This factor, as well, was taken into account in the determination of the optimum configuration of the intermediate, mutual crossing portions of the crossed main leads. Accordingly, the crossing of the main leads was found to produce corresponding crossings of their respective eddy current images on the lead box walls. One such eddy current crossing occurs in the wall next to the intermediate, mutual crossing portions of the crossed main leads and the other occurs between the vertical and slanted pant legs of the pair of crossed main leads. No techniques or procedures are known for precisely defining the extent of increased heating which these new eddy current patterns would produce. However, an assumption was made that the eddy current heating would double the amount of such heating produced by standard leads. Accordingly, steps were taken to effectively double the velocity of the cooling gas flow in the localized areas of the lead box walls subjected to increased heating, as above defined.

It was surprisingly discovered that the doubling of the gas flow could be accomplished quite readily in the actual generator being modified in accordance with the invention. Particularly, the ventilation modification was achieved by closing off conventional openings in an upper plate of the lead box which conventionally afforded a random gas flow of an average velocity of approximately 1,400 feet per minute into the lead box, and installing ventilating ducts which directed the gas flow along the localized portions of the lead box walls which were subjected to increased heating due to the increased eddy current effects, as above defined. The reduced area of the ducts increases the entrance velocity of the gas flow to approximately 3,000 feet per minute, effectively doubling the normal and consistent with the expected increased heating level relative to the standard. It was surprisingly discovered that the increased gas flow along the surface of these portions of the sidewalls subjected to increased heating adequately increased the surface heat transfer to compensate for the increased heating loss produced in the affected, localized wall portions of the lead box. This surprising discovery is fortuitous, moreover, in that no basic modification of the ventilation system so as to increase the total volumetric gas flow into the lead box was necessitated, and yet adequate cooling of the entirety of the lead box was maintained.

Accordingly, it is an object of the present invention to provide a method and apparatus for changing the direction of phase sequence of a large dynamoelectric machine, such as a turbine generator, the construction of which is fully completed and which has a predetermined and fixed direction of phase sequence opposite to that desired.

Another object of this invention is to provide a method and apparatus for changing the direction of phase sequence of such a dynamoelectric machine, which does not require alteration of major interior components of the machine such as the parallel ring structure or connections made to the parallel ring structure.

Still another object of the invention is to provide a method and apparatus for changing the phase sequence of such a dynamoelectric machine through the provision of crossed main leads which interconnect external bushing connectors and internal parallel rings.

Yet another object of the invention is to provide a method and apparatus for changing the phase sequence of such a dynamoelectric machine by utilizing crossed main leads and for providing adequate cooling of an associated lead box which houses the crossed main leads to compensate for increased heating of the lead box walls due to increased eddy currents therein caused by the crossed main leads.

Yet another object of the invention is to provide a method and apparatus for changing the phase sequence of such a dynamoelectric machine by utilizing crossed main leads and for providing adequate structural supports to compensate for increased forces interacting between the crossed main leads themselves and between the crossed main leads and the lead box which houses same due to the increased eddy current effects produced by the crossing of the main leads, while also satisfying strike and creep distance limitations.

The foregoing and other objects and benefits of the invention will be made more clear from the following detailed description of the drawings wherein like numerals identify the identical parts, throughout.

BRIEF DESCRIPTION OF THE DRAWINGS

FIG. 3 is an exploded perspective view of the main lead box of the generator FIG. 1;

FIGS. 4A and 4B are simplified schematics of the outputs of three phase windings of a generator as in FIG. 1 having a counter-clockwise rotating rotor and producing a standard direction of phase sequence, and FIG. 4B illustrating the schematic result of employing crossed main leads for achieving the reverse direction of phase sequence;

FIG. 6 is a transverse elevational and end view of the structure of FIG. 5;

FIGS. 7D and 7E and FIGS. 7F and 7G are fragmentary views of end portions of the main leads of FIGS. 7B and 7E, respectively.

DETAILED DESCRIPTION OF THE PREFERRED EMBODIMENT

Figure 1:
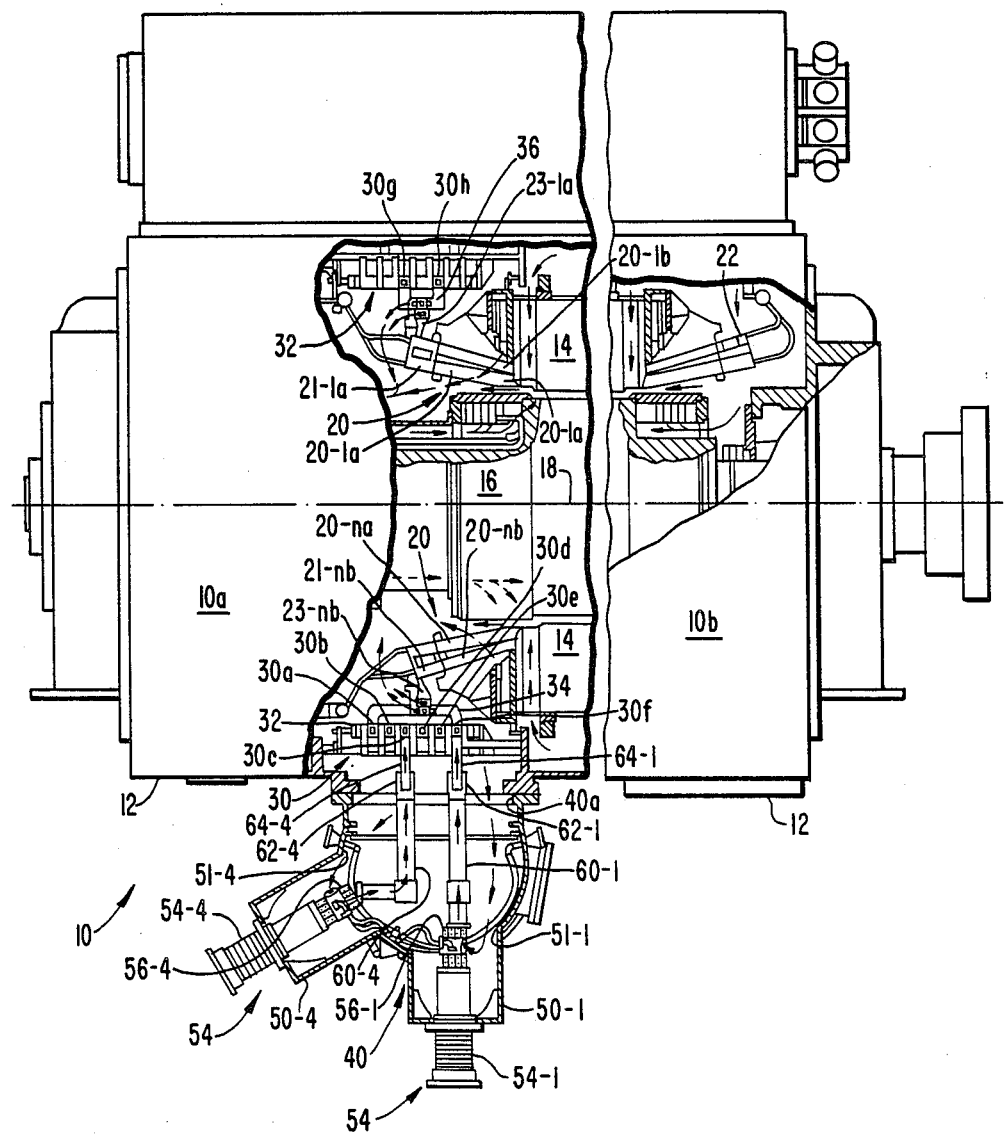
FIG. 1 is a transverse sectional view, partly broken a turbine generator having conventional main leads which may be replaced by the crossed main leads of the present invention for changing the direction of phase sequence.

FIG. 1 is a transverse sectional view, partially broken away, of a turbine generator 10, illustrative of a type of dynamoelectric machine to which the present invention is applicable. More particularly, the generator 10 of FIG. 1 is of a conventional type and comprises a housing, or casing structure, 12 which houses a laminated stator core 14 and rotatable rotor 16 having a common axis 18, the stator of course being fixed in position and the rotor being rotatable about the axis 18. Stator core 14 is a cylindrical structure having parallel, spaced slots extending radially from the inner periphery of the stator core 14 and which receive, in conventional fashion, a suitable number of socalled half coils, or coil sides, the coil sides protruding from the ends of the stator coil in an annular array and forming a so-called coil basket 20. In the particular generator 10 illustrated in FIG. 1, two coil sides 20-1a and 20-1b are received respectively in the inner and outer portions of a given such slot within the core 14 and are shown protruding outwardly therefrom at each of the left and right ends of the stator core 14. As is known, associated second coil sides for the coil sides 20-1a and 20-1b are disposed in a common slot or two different slots, angularly displaced from the given slot of coil sides 20-1a and 20-1b depending upon whether the winding pattern is full-pitch winding, fractional pitch, corded, or the like. Moreover, as is known, a number of coil sides in adjacent slots and associated with the same phase constitute a "phase belt." All phase belts are alike when an integral number of slots per pole per phase are used and, for a normal machine, the peripheral angle subtended by a phase belt is 60 electrical degrees for a three-phase machine of the type herein illustrated.

The generator 10, as commercially produced, employs shorted pitch winding and is a four-pole machine. If it were a two-pole machine and employed full-pitch winding, coil sides 20-1a and 20-1b would have corresponding coil sides displaced 180 electrical degrees therefrom and correspondingly 180 physical degrees therefrom, thus being diametrically opposite same, relative to the axis 18. Conversely, as a four-pole machine employing full-pitch winding, the associated set of coils would be displaced by 180 electrical degrees but by only 90 physical degrees and thus would lie in a plane perpendicular to that of coil sides 20-1a and 20-1b. The relative displacement of the associated coil sides in a machine employing shorted pitch windings, of course, is somewhat more complex, resulting in physical displacements of values differing from 90 degrees and 180 degrees for two- and four-pole machines, respectively. As illustrated, the generator 10 is a distributed three-phase, four-pole machine with shorted pitch windings, and thus there are shown at an illustrative position below the axis 18, a pair of inner and outer coil sides 20-na and 20-nb representing complementary coil sides of a different phase belt. In the end portion 10b of the generator 10 and thus adjacent the right end of core 14, as viewed in FIG. 1, is illustrated a series connector 22 which serves to provide series interconnections of the coil sides 20-1b and 20-1a with other such coil sides (not illustrated), as will be explained with reference to FIG. 2. At the left end portion 10a of the generator 10 as seen in FIG. 1, termed the exciter end, coil sides 20-na and 20-nb represent coil terminating sides for corresponding stator phases and accordingly have electrical phase terminals 21-1a and 21-nb electrically connected to corresponding phase leads 23-1a and 23-nb.

A set of parallel rings 30 is arranged in a bank of six (6) axially spaced annular paths of common radius, held in position by an annular supporting block 32 which is affixed to the outer casing 12. Six conductor rings 30a through 30f are illustrated in the portion of FIG. 1 below the axis 18 and yet further conductor rings 30g and 30h are shown in the portion above the axis 18 in FIG. 1. Ring extension 34 connects phase lead 23-nb to conductor ring 30f, and ring extension 36 connects phase lead 23-1a to conductor ring 30h.

Figure 2:
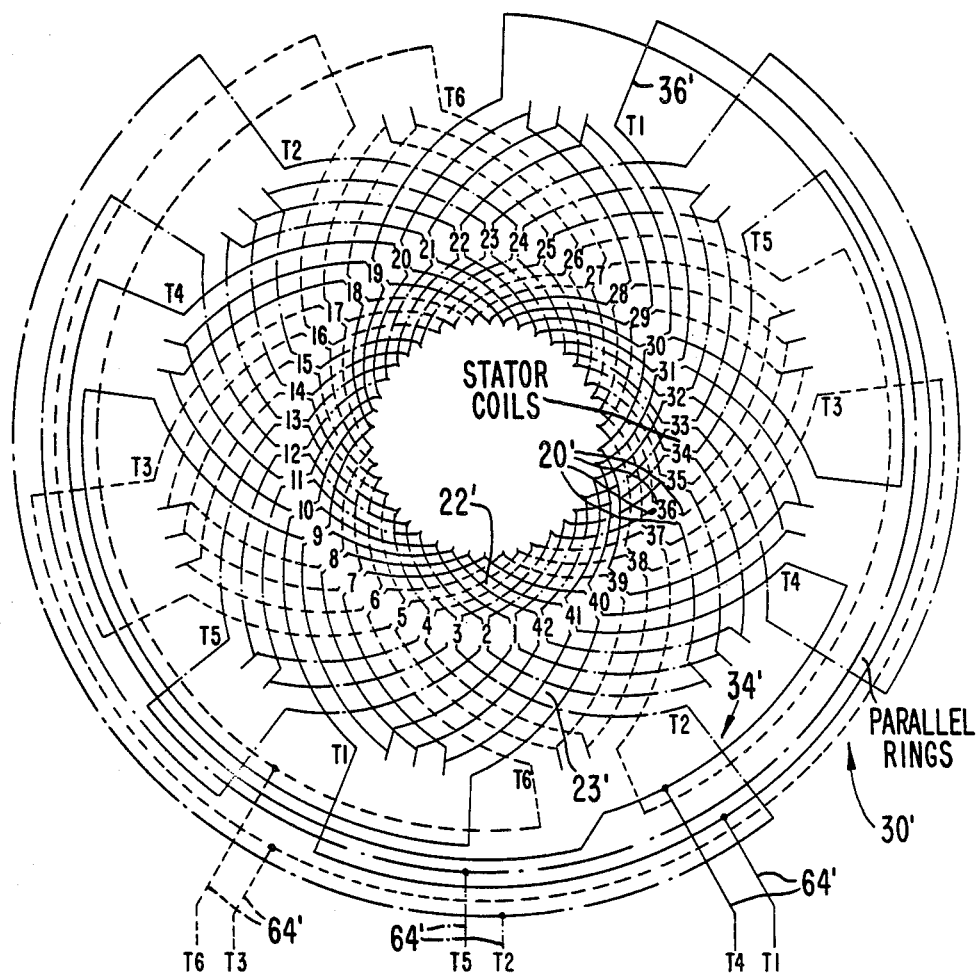
FIG. 2 is a conventional wiring and phase sequence duagram, illustrating a standard phase sequence T1-T2-T3 for a counter-clockwise rotation of the rotor.

For a greater understanding of the wiring arrangement as thus far described, reference is had to the conventional wiring and phase sequence diagram of FIG. 2 which is taken as viewed from the exciter end 10a of the generator 10 of FIG. 1. The particular diagram of FIG. 2 illustrates a four pole, three-phase wiring arrangement with two coil sides per slot in each of 42 slots. This is only illustrative and in no way limiting to the general applicability of the present invention, however. The outer concentric circular segments 30' correspond to the parallel rings 30 illustrated in FIG. 1, the lines 34' and 36' extending radially inwardly therefrom represent the ring extensions 34 and 36 and the arcuate lines 23' in the next annular inner segment correspond to the phase leads 23. The numbers 1 through 42 appearing in an annular circle in FIG. 2 correspond to the slots in the stator core 14 of FIG. 1 and the broken, but aligned, short parallel lines 20' extending radially inwardly toward and from the annulus of numbers 1 through 42 represent coil sides such as 20-1a, 20-1b, etc., illustrated in FIG. 1. The innermost annular groupings of arcuate lines 22' correspond to the series connectors 22 between the coil sides, as shown and referenced in FIG. 1 at the end 10b of the generator 10. Finally, the radial lines 64' in FIG. 2 represent the connectors 64 to the parallel rings 30 in FIG. 1, T1-T6 designating the phases of the outputs from the six terminating ends of the three stator winding phases. For a (standard) reverse direction of rotation of the rotor, the standard phase sequence of T1-T2-T3 is produced. As will be appreciated, a complex arrangement of interconnections is employed, and changing the parallel rings and/or connections thereto is complex; moreover, the elements simply are not accessible in a completed machine.

A lead box 40 is secured to the sidewall of the casing 12 typically by bolts (not shown) so as to be removable therefrom. With concurrent reference to FIG. 3, the open, upper end 41 of the box 40 is divided into compartments 41a, 41b, 41c, 41d and 41e, compartments 41b and 41d being open to provide for air flow passage into the lead box 40. Each of compartments 41a, 41c and 41e, on the other hand, is closed by split, adjoining support plates 43a, 43b which are of identical construction and thus are commonly referenced. The plates 43a, 43b define mating, half circular openings 44a, 44b and 45a, 45b and together are received on and secured to a surrounding support flange 47, within each of the compartments 41a, 41c and 41e.

A plurality of bushings 50 is secured to the lead box 40, the set of three bushings 50-1, 50-2 and 50-3 being in parallel axial relationship and laterally aligned, and extending vertically downwardly therefrom and the set of three bushings 50-4, 50-5 (not shown) and 50-6 extending angularly and in laterally aligned, parallel axial relationship from the lead box 40. The lead box 40 has openings 51 in its sidewalls corresponding to the open tops of the bushings 50, as shown by the illustrative opening 51-5 in FIG. 2 (for the bushing 50-5 (not shown)) and as illustrated by openings 511 and 51-4 in FIG. 1. Plural flexible connector assemblies 54 are received through and secured in the corresponding bushings 50 and to the box 40, as illustrated in FIG. 1 by flexible connector assemblies 54-1 and 54-4 and in FIG. 2 by flexible connector assemblies 54-3 and 54-6, the assemblies 54 carrying connectors 56 on the top ends thereof, as shown in FIG. 1 by connectors 56-1 and 56-4 and in FIG. 2 by connectors 56-3 and 56-6.

Plural main leads 60, corresponding to the number of phases and for both ends of each of the three-phase windings, interconnect respective parallel rings 30 with the top ends 56 of the flexible connectors 54. For the three-phase system of generator 10 as seen in FIG. 1, therefore, six main leads 60 are provided, of which main leads 60-1 and 60-4 are illustrated in FIG. 1 and main leads 60-3 and 60-6 are illustrated in FIG. 3. Progressing from the exploded view of FIG. 3 to the assembled and transverse elevational view of FIG. 1, the main leads are received within the box 40 and supported intermediate their vertical lengths on a pair of split support plates 43a, 43b passing through the aperture defined by the respective half-circular openings 45a and 45b therein, with the lower ends connected to the connectors 56 of the flexible connector assemblies 54. Corresponding connectors 62 at the top ends of the main leads 60 are positioned closely adjacent the parallel rings 30, as shown by connectors 62-1 and 62-4 in FIG. 1. Further, connector bars 64 extend between and interconnect the connectors 62 and the corresponding parallel rings 30, as shown by connector bars 64-1 and 64-4 in FIG. 1, respectively interconnecting the connectors 62-1 and 62-4 with the parallel rings 30f and 30c.

The conventional main leads 60-1 through 60-3 thus extend in generally parallel axial and spaced relationship between the respective second set of connectors 56-1 through 56-3 and the first set of connectors 62-1 through 62-3. Typically, the straight axial main leads 60-1 through 60-3 and corresponding flexible connectors 54-1 through 54-3 are those to which connections are made by a utility customer. The set of angularly offset connector assemblies 54-4 through 54-6 on the other hand are electrically interconnected by a shunt bar (not shown) to form the Y-connection of the corresponding three-phase stator windings.

FIG. 4A is a schematic illustration of the standard phase sequence of a three-phase generator as in FIG. 1, having a counter-clockwise rotor rotation designated by arrow RR, consistent with the nomenclature of the assignee herein. FIG. 4B schematically illustrates the achievement of the reverse phase sequence for that same generator by the use of crossed main leads in accordance with the present invention. In each of FIGS. 4A and 4B, the three-phase windings PH1, PH2 and PH3 are connected in a "Y" configuration at the common junction 54-4', 54-5', 54-6', as referenced in the preceding with regard to the shunting bus connected to the flexible connectors 54-4, 54-5, and 54-6. By similar parallel reference, the connectors 54-1, 54-2 and 54-3 are indicated in FIGS. 4A and 4B by their corresponding, primed numbers. Comparing FIG. 2 with FIG. 4A, the three-phase stator coil outputs T1, T2 and T3 are represented by the primed designations T1', T2' and T3' with the main leads 60-1', 60-2' and 60-3' respectively connecting same to the flexible connectors 54-1', 54-2' and 54-3'. There results the standard direction of phase sequence, as shown by arrow SPH, of T1'-T2'-T3'.

To accomplish the reverse phase sequence shown by arrow RPH in FIG. 4B, the two adjacent standard main leads 60-3' and 60-2' of FIG. 4A, are replaced by crossed main leads 80' and 81', the third, remaining main lead 60-1' being unchanged. For the common counterclockwise direction of rotor rotation shown by arrow RR, there results a reverse phase sequence shown by the arrow RPH producing in effect the sequence T3'-T2'- T'. In operation due to the crossing of the leads from T2' and T+ within the lead box 40 the output from the lead box is in the reverse sequence 54-3'-54-2'-54-1'.

The physical implementation of the crossed main leads for achieving reversal of the direction of phase sequence, as before-noted, has not been heretofore attempted due to the attendant difficulties and since inconsistent with standard design principles which dictate against such a design. In accordance with the invention, however, the use of crossed main leads for this purpose has been proven to be viable and to offer a highly attractive solution to the problem of reversing the direction of phase sequence of a completed generator. In the following, reference will be had concurrently to FIGS. 5 and 6 which comprise simplified, transverse front and end elevational views of the crossed main leads 80 and 81, supporting structures therefor and ventilation modifications to permit the implementation of crossed main leads and to render same viable for achieving the change of the direction of phase sequence.

Figure 5:
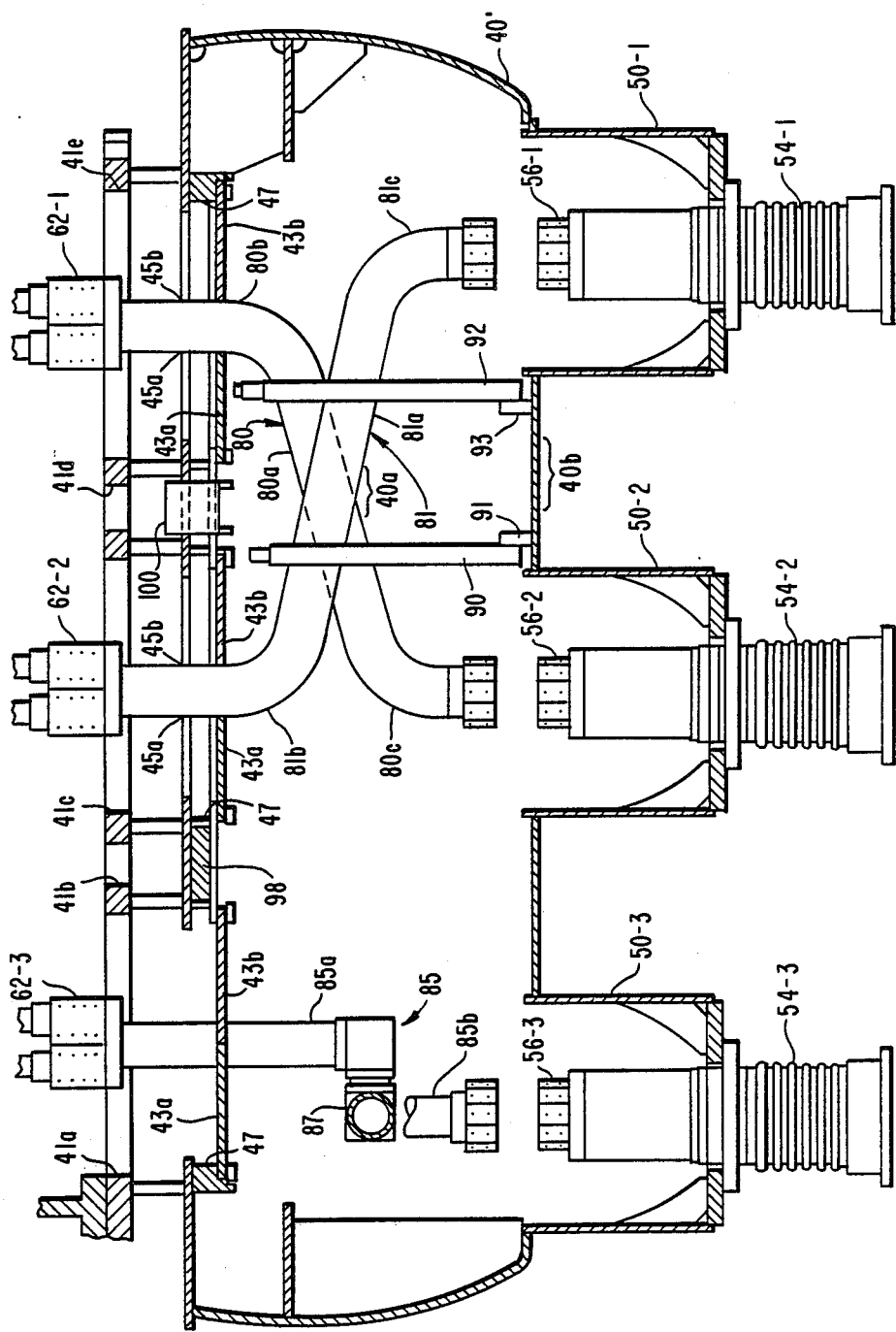
FIG. 5 is a transverse elevational view showing crossed main leads in accordance with the present invention within a lead box.

In the actual practice of the invention, as illustrated in the drawings, a further modification of the generator 10 was necessary, as shown in its completed, constructed form in FIGS. 1 and 3, to accommodate the current rating of the machine, consistent moreover with the customer's specific requirements; specifically, as best seen in FIG. 5, the spacings between the flexible connectors 54-1, 54-2 and 54-3 are greater than the spacings between the first set of connectors 62-1, 62-2 and 62-3. Accordingly, while the central connectors 62-2 and 56-2 of the first and second sets, respectively, remained aligned, the outer connectors 56-1 and 56-3 of the second set were offset from the respective, outer connectors 62-1 and 62-3 of the first set. The circumstance was fortuitous in that it demonstrated the surprising flexibility and adaptability of the invention. As will be seen, the increased spacing imposed even more stringent requirements in the implementation of the crossed main leads and particularly as to main lead 81 which now was required to span an even greater lateral displacement for the interconnection of the connectors 62-2 and 56-1. Main lead 85, on the other hand, employed a standard right angle offset, or elbow, 87 for interconnecting the correspondingly offset straight axial segments 85a and 85b thereof and thereby interconnecting the offset connectors 62-3 and 56-3. For purposes of terminology herein and in the claims, however, it is to be understood that the connectors 62-1 and 56-1 and the connectors 62-3 and 56-3 of the first and second sets, respectively, are deemed "substantially" or "generally" aligned despite the relative lateral displacements or offsets thereof as seen in FIG. 5. In other words, the terminology of "substantially aligned" and/or "generally aligned" does not require geometrical, physical alignment but rather describes the usual one-to-one electrical interconnection arrangement. Likewise, it will be understood that conventional main leads such as 60-1, 60-2 and 60-3 of FIGS. 1 and 3 are characterized as "substantially straight axial" leads even though contoured or provided with angular offsets to accommodate the corresponding offset of the outer connectors 62-1, 62-3 and 56-1, 56-3 of the first and second sets, respectively. By contrast, crossed main lead 80 diagonally interconnects the diagonally-related pair of connectors 62-1 and 56-2 of the first and second sets, respectively, and crossed main lead 81 diagonally interconnects the correspondingly diagonally-related pair of connectors 62-2 and 56-1 of the respective, first and second sets.

The crossed main leads 80 and 81 are now further described with concurrent reference to FIGS. 7A through 7G. Main leads 80 and 81 respectively comprise central portions 80a and 81a having bends therein, and which encompass, or span, the mutual, intermediate crossing portions thereof as seen in FIG. 5, and extend between and integrally interconnect the first, upper end portions 80b and 81b which likewise have bends therein, and second, lower end portions 80c and 81c, which also have bends therein. The upper end portions 80b and 81b, best seen in the fragmentary views of FIGS. 7C and 7F, respectively, each comprise a straight axial segment extending to the terminal end of the respective leads 80 and 81 and a bend portion integrally joining and forming a smoothly contoured integral connection with the respective ends of the central portions 80a and 81a, respectively. The lower end portions 80c and 81c, best seen in the fragmentary views of FIGS. 7D and 7G, respectively, have bends substantially throughout, with very short straight axial portions extending to the respective terminal ends of the respective leads 80 and 81 and the bend portions thereof forming a smoothly contoured, integral connection with the respective ends of the central portions 80a and 81a, respectively.

Figure 7A:
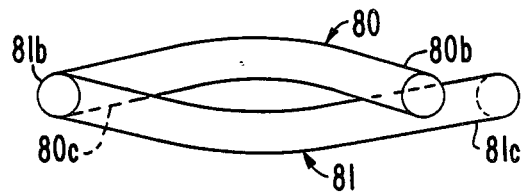
FIG. 7A is a planer view of the assembled relationship of crossed main leads in accordance with the invention.

FIG. 7A thus is a top plan view of the crossed leads 80 and 81 in their assembled relationships, as shown in FIGS. 5 and 6, and positioned relatively to FIG. 5 to illustrate the alignment of the respective terminal ends thereof with the corresponding, diagonally-related connectors of the first and second sets. This alignment is most easily seen as to the open, upper terminal end of lead 80 with connector 62-1 and the (hidden) open, lower terminal end of lead 81 with the lower connector 56-2, due to their offset from a vertically aligned relationship.

Figure 7B:
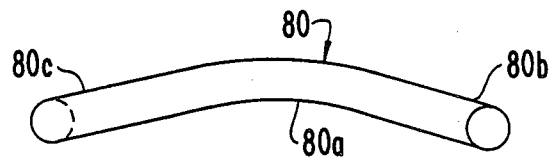
FIGS. 7B AND 7E are planar views of the individual crossed main lead.
Figure 7D:
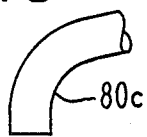
Figure 7C:
Figure 7E:
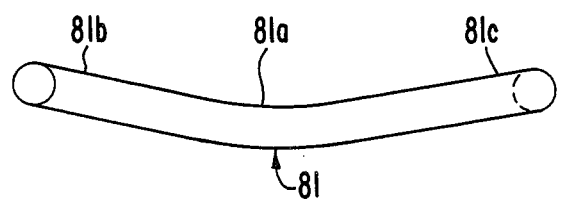
Figure 7F:
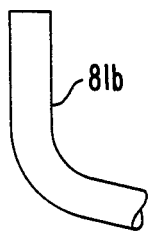
Figure 7G:
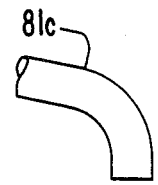

FIGS. 7B and 7E illustrate the respective leads 80 and 81 with respect to the radius of curvature of the central portions 80a and 80b thereof, each having approximately a 36 inch radius of curvature value affording substantially symmetrical outward displacements of the central portions 80a and 80b of the leads 80 and 81 in both horizontal (FIG. 7A) and vertical (FIG. 6) planes. FIGS. 7C and 7D represent the upper and lower end portions 80b and 80c of the lead 80, each having a radius of curvature of 8 inches blending into the straight axial segments extending to the terminal ends of the lead 80, as before defined, and which are assembled with the connectors 62-1 and 56-2, respectively. FIGS. 7F and 7G correspondingly illustrate the end portions 81b and 81c of lead 81, each having a bend with a radius of curvature of approximately 8 inches blending with the integral central portion 81b and a straight axial portion extending to the respective terminal ends of the lead 81 which are assembled with the respective connectors 62-2 and 56-1 of the upper and lower, or first and second, sets.

To further elaborate upon the dimensional relationships as hereinabove set forth, the illustration of FIG. 5 corresponds to a circumstance in which the spacing between the connectors 62-1, 62-2 and 62-3 of the first set are spaced for example by 40 inches between respective central axes thereof and the flexible connectors 56-1, 56-2 and 56-3 of the second set (and thus the corresponding flexible connectors 54-1, 54-2 and 54-3) are axially spaced by 48 inches. It follows that crossed main lead 81 extends laterally a greater distance than crossed main lead 80. Crossed main lead 80 thus has an overall length of approximately 70 inches, with a central portion of approximately 40 inches and at least the encompassed, mutual crossing portion thereof includes a bend having a radius of curvature of 36 inches whereas the respective end portions have radii of curvature of approximately 8 inches. Crossed main lead 81 on the other hand has an overall length of approximately 80 inches with a central portion of approximately 50 inches, the encompassed, mutual crossing portion being only approximately 22 inches and encompassing a bend having a radius of curvature of approximately 36 inches, with straight axial portions joining the respective end portions. In both leads 80 and 81, the end portions include bends of approximately an 8 inch radius of curvature. In both instances, the copper pipe from which the crossed leads 80 and 81 is formed may be of approximately 5 inches outside diameter and 4.5 inside diameter. While the bend radius of 8 inches is not necessarily limiting, it is difficult to achieve much sharper bends while maintaining the requisite standard herein of the cross-sectional configuration of the copper pipe not departing substantially from its original circular cross-section and uniform wall thickness.

Figure 8B:
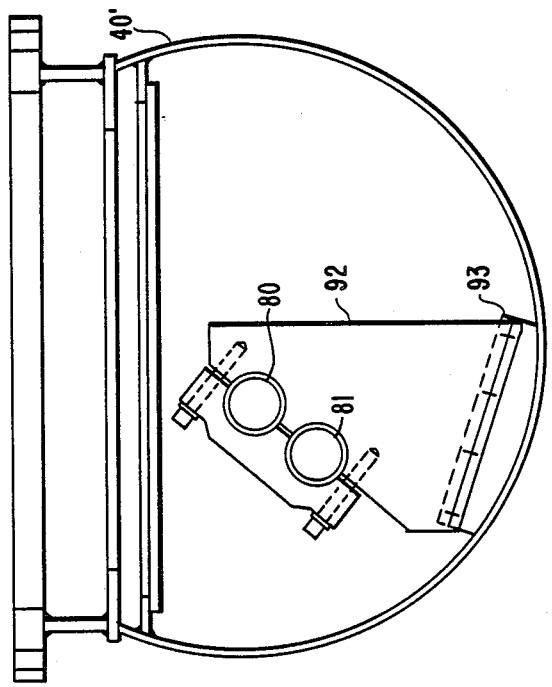
FIGS. 8A and 8B are simplified, transverse elevational views illustrating supports for the crossed main leads as mounted within a lead box in accordance with the invention.
Figure 8A:
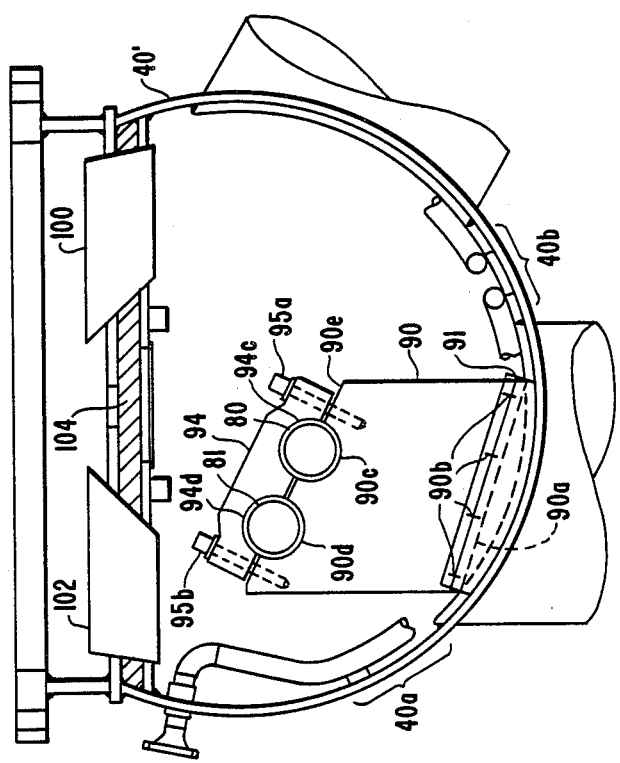

Plates 90 and 92 are seen in a vertical edge view in FIG. 5 and in vertical elevational views in FIGS. 8A and 8B, respectively. While the configurations differ, the structures are substantially the same mechanically and thus are described in detail only as to plate 90 of FIG. 8A. Adjacent a lower edge 90a of plate 90 there are is provided a series of spaced holes 90b for receiving bolts (not shown) to secure same to the mount 91 affixed to the lower internal wall surface of the box 40 . In like fashion, plate 92 is affixed to the mount 93. Semi-circular recesses 90c and 90d are formed in the plate 90, extending downwardly from an upper edge 90e, to accommodate therewithin the crossed leads 80 and 81. Bracket 94 has semicircular recesses 94c and 94d mating the recesses 90c and 90d for circumferentially engaging and securing the respective leads 80 and 81 therewithin, insulating screws 95a and 95b securing the bracket 94 to the plate 90. The plates 90 and 92 preferably are formed of and electrically insulating and structurally strong material, such as commercially available "green glass" and are approximately 2 inches thick and suffice, for adequately mechanically securing the crossed leads 80 and 81 in position despite the increased forces created therebetween due to their proximity, while satisfying requisite voltage strike distances.

As before-noted, the eddy currents produced in the sidewalls of the box 40' reflect their sources, i.e., the crossed leads 80 and 81; particularly, increased eddy currents occurred in the localized regions 40a and 40b of the walls of box 40'. To provide increased cooling of these regions 40a and 40b, a plate 98 (FIG. 5) was installed to seal off the opening within compartment 41b and, with concurrent reference to FIGS. 5 and 6, directional ventilating ducts 100 and 102 were installed within the compartment 41d and a sealing plate 104 mounted so as to close off the remainder of the opening of compartment 41b. This arrangement forces substantially all of the cooling gas flow, otherwise randomly entering through the opening of compartment 41b, through the ducts 100 and 102 for directing same at the wall surfaces 40a and 40b of box 40' to enhance heat transfer therefrom. As before-noted, this ventilation modification was designed to effectively double the velocity of the air flow over the localized areas 40a and 40b, and served to cool same sufficiently to maintain normal operating temperatures in those areas, while the remaining air flow throughout the interior of the box 40' sufficed to cool same sufficiently. Clearly, supplemental air flow could be afforded in another installation if this result did not obtain, the significant factor being to effectively increase the air flow to the localized, heated areas in an amount proportional to the increased heating effects produced by the increased eddy currents in the walls.

The foregoing modifications were surprising discovered to be sufficient to enable realization of the change of direction of phase sequence by the relatively simple expedient of employing crossed main leads in substitution for the standard, substantially straight axial leads with which the generator in question was originally equipped. Moreover, the design standards hereinabove set forth are applicable to and will enable the practice of this invention with a broad range of turbine generators.

While modifications and adaptations of the present invention will be apparent to those of skill in the art, it is intended by the appended claims to cover all such modifications and adaptations which fall within the true spirit and scope of the present invention.

We claim as our invention:

1. An electrical power generator having a housing enclosing a stator with plural, series connected coil sides arranged in corresponding, plural phase bands with respectively associated terminating coil sides and phase terminals, at least a first set of connectors secured in fixed positions relatively to the housing and disposed in spaced, common-planar and parallel-axial relationship and connected to predetermined, respective phase terminals, the plural phases of the generator output voltages being produced at the respective connectors of the first set in accordance with a predetermined phase sequence, a lead box of side and bottom enclosing walls and a top wall which is substantially open, secured to the housing and communicating through the open top wall with the first set of connectors, and a second set of plural connectors secured in fixed positions relatively to the bottom wall of the lead box and in spaced, common-planar and parallel-axial relationship, the plural connectors of the second set being generally aligned with respective, plural connectors of the first set, comprising:

a pair of crossed main leads respectively interconnecting adjacent pairs of the generally aligned, respective connectors of the first and second sets thereof in diagonally-related relationship and a third main lead interconnecting the remaining, generally aligned pair of connectors of the first and second sets, the crossed main leads in conjunction with the third main lead supplying the generator output voltage phases to the second set of connectors in reverse phase sequence relatively to the predetermined phase sequence of the generator voltage output phases as produced at the first set of connectors; and the crossed main leads each having opposite end portions aligned with the respective, diagonally-related connector of the first and second sets and a central portion extending between and interconnecting the end portions, the respective central portions encompassing intermediate, mutual crossing portions defining acute included angles therebetween laterally oriented relatively to the generally aligned axial relationship of the connectors of the first and second sets and the respective, mutual crossing portions being displaced from each other by at least a minimum, predetermined distance throughout the respective extents thereof so as to satisfy voltage strike requirements for the requisite test and operating voltage levels of the corresponding voltage phase outputs of the generator.

2. An electrical power generator as recited in claim 1, wherein:

each of the crossed main leads comprises an elongated, hollow conductive pipe, the opposite end portions thereof being axially aligned with the respective, diagonally-related pair of connectors of the first and second sets and having respective bends therein affording a smoothly contoured, integral connection with the associated central portion thereof, the central portions of the respective, crossed main leads having corresponding and complementary outward bends, relatively to each other, to establish the minimum, predetermined distance therebetween throughout the extent of the mutual crossing portions thereof.

3. An electrical power generator as recited in claim 2, wherein:

the bends in the opposite end portions and in the central portion of each of the crossed main leads are defined by radii of curvatures of no less than a minimum dimension, relatively to the original cross-sectional dimensions of the pipe, so as to maintain the original cross-sectional and wall thickness dimensions substantially without change throughout the extent of each of the bends therein.

4. An electrical power generator as recited in claim 3, wherein:

the hollow conductive pipe is of circular cross-section and has an outer diameter of approximately 5.0 inches and an inner diameter of approximately 4.5 inches, the bend radii of the end portion each being of approximately 8 inches.

5. An electrical power generator as recited in claim 3, wherein the central portion of each of the crossed main leads is a minimum of approximately 20 inches and the bend therein is defined by a bend radius of curvature of approximately 36 inches.

6. An electrical power generator as recited in claim 3, wherein:

the bend radius of curvature of each of the end portions relatively to the diameter of the pipe is not substantially less than a ratio of 8 to 5.

7. An electrical power generator as recited in claim 1, wherein:

the spacing between the connectors of the first set is less than the spacing between the plural connectors of the second set and wherein each of the first and second sets comprise three corresponding connectors, the central connectors of each of the first and second sets being substantially directly aligned and the first and third, respective outer connectors of the first and second sets being in generally aligned, but offset relationship; and the crossed main lead diagonally interconnecting the central connector of the first set with the outer connector of the adjacent pair thereof of the second set has a relatively, axially longer central portion than that of the crossed main lead diagonally interconnecting the outer connector of the first set of the adjacent pair thereof with the central connector of the second set.

8. An electrical power generator as recited in claim 1, the lead box defining at least a lower wall having a periphery and spaced side walls extending from the periphery of the lower wall to the top wall, further comprising:
  first and second support plates secured to the lead box and extending in parallel relationship transversely to the common plane of the aligned axes of the first and second sets of connectors, the first and second support plates being spaced apart and respectively positioned adjacent the extremities of the intermediate, mutual crossing portions of the central portions of the crossed main leads; and
  each plate having a pair of downwardly extending and spaced recesses therein for receiving and supporting within the respective recesses the corresponding, crossed main leads for withstanding the mechanical attraction forces produced therebetween by current flow through the crossed main leads and thereby maintaining same in spaced relationship in accordance with the minimum, predetermined distance therebetween.

9. A electrical power generator as recited in claim 1, the generator having a forced flow of a cooling fluid within the housing and the lead box being disposed to receive therein, through the open upper wall thereof, at least a portion of the forced cooling fluid flow from within the generator housing for cooling the lead box walls, further comprising:
  directional ducts secured to the top wall of the lead box for directing air received therein to corresponding, localized portions of the bottom and side walls of the lead box subjected to increased heating due to increased eddy current effects produced therein, relatively to the remainder of the lead box walls, by the current flow through the crossed main leads; and
  means for substantially closing the remaining portion of the open top wall of the lead box to confine the forced cooling fluid flow from within the generator housing to passage through the directional ducts and into the lead box.

10. An electrical power generator as recited in claim 1, wherein:
  the lead box comprises elongated side walls extending in a lateral direction parallel to the common plane of the generally aligned axes of the respective pairs of connectors of the first and second sets thereof; and
  the crossed main leads are disposed closer to a predetermined one of the elongated side walls of the lead box and produce increased eddy current effects and resultant increased heating in the closer elongated wall in a localized area defined substantially by the intermediate, mutually crossing portions of the respective central portions of the crossed main leads and in an adjacent localized area of the bottom wall of the lead box, relatively to the remainder of the lead box walls.

11. An electrical power generator as recited in claim 10, the generator having a forced flow of a cooling fluid within the housing and the lead box being disposed to receive therein, through the open upper wall thereof, at least a portion of the forced cooling fluid flow from within the generator housing for cooling the lead box walls, further comprising:
  directional ducts secured to the top wall of the lead box for directing air received therein to corresponding, localized portions of the bottom and side walls of the lead box subjected to increased heating due to increased eddy current effects produced therein; and
  means for substantially closing the remaining portion of the open top wall of the lead box to confine the forced cooling fluid flow from within the generator housing to passage through the directional ducts and into the lead box.

12. An electrical power generator as recited in claim 1, further comprising:
  electrical insulation on the surface of the crossed main leads extending at least circumferentially about and along the outside surface of at least the mutual crossing portions of the respective central portions of the crossed main leads.

* * * * *